June 11, 1963 J. L. ANDERSON 3,093,748
SUPERCONDUCTIVE CIRCUITS CONTROLLED BY SUPERCONDUCTIVE PERSISTENT CURRENT LOOPS
Filed Dec. 23, 1957 3 Sheets-Sheet 1
FIG. 1
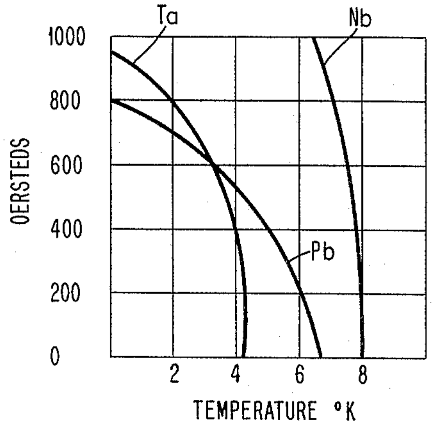
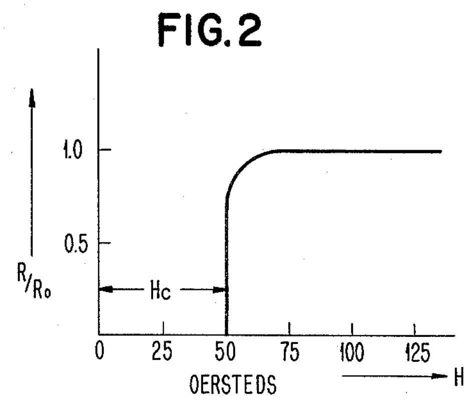
FIG. 3
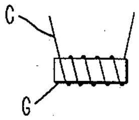
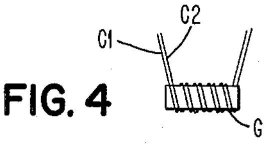
FIG. 3A
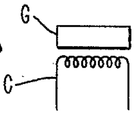
FIG. 4A
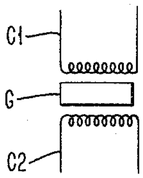
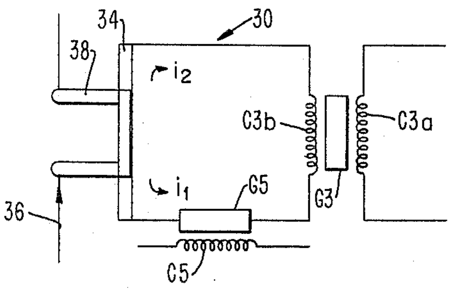
FIG. 6
INVENTOR.
JOHN L. ANDERSON
BY John E Daugherty Jr.
ATTORNEY 3,093,748

SUPERCONDUCTIVE CIRCUITS CONTROLLED BY SUPERCONDUCTIVE PERSISTENT CURRENT LOOPS

John L. Anderson, Poughkeepsie, N.Y., assignor to International Business Machines Corporation, New York, N.Y., a corporation of New York Filed Dec. 23, 1957, Ser. No. 704,627
32 Claims. (Cl. 307—88.5)

The present invention relates to superconductor circuitry and, more particularly, to multistable superconductor circuits employing cryotron type devices wherein superconductor loops in which persistent currents may be established are employed both in controlling the state of the circuit and in the switching of the circuit between its stable states.

The phenomenon of superconductivity has been known for a great many years and a large research effort has been expended in the investigation of superconductor materials and their characteristics. More recently, as new and more efficient low temperature refrigeration equipment has been developed, a great deal of interest and effort has been directed toward the possible applications of superconductor devices in electric and electronic functional circuits. For a theoretical discussion of superconductivity, reference may be made to the book entitled "Superconductivity" by D. Shoenberg, the second edition of which was published in 1952 by the Syndics of the Cambridge University Press. Examples of some of the relatively early superconductor circuit applications are described in U.S. Patents No. 2,666,884; 2,704,431; and 2,725,474, issued respectively on January 19, 1954; March 22, 1955; and November 29, 1955. Further examples of superconductor circuitry are found in an article by Dudley Buck which appeared in the Proceedings of the IRE, April 1956, pp. 482–493. This article is particularly directed toward superconductor circuits usable in computers and the basic switching element proposed for use in such circuits is a device which is termed a cryotron and which comprises a gate conductor of superconductor material around which is wound one or more control coils. The gate conductor is maintained at a temperature below that at which it becomes superconductive and its superconductivity may be selectively quenched by energizing the control coil or coils so that a field in excess of the critical field necessary to cause a transition to a normal state at the particular operating temperature is applied to the gate.

Another characteristic of the superconductor state is that once a current is established in a completely closed loop of superconductor material, that current persists until resistance is introduced into the loop. A persistent current may be stored in such a loop by first driving a portion of the loop into a resistive state and thereafter allowing that portion to again become superconductive at a time when there is a net flux threading the loop. Once the entire loop again becomes superconducting, there can be no change in the net flux which threads the loop and, therefore, a persistent current is established in the loop to maintain the net flux constant as the input signal is removed. The present invention employs cryotron type devices and superconductor loops in which persistent currents may be established in circuits capable of assuming at least first and second stable states and of being switched back and forth between these stable states.

A broad object of the invention is to provide improved superconductor circuits such as might be employed in computers and other data handling systems.

A further object is to provide improved superconductor circuits wherein persistent current loops are employed to control the division of current between parallel superconductive paths.

Still another object is to provide improved superconductor circuits capable of assuming a plurality of different stable states.

A further object is to provide an improved binary input trigger circuit.

These objects and others set forth below are achieved, as is illustrated in the embodiments of the invention described herein by way of illustration, by employing cryotron type devices having a control conductor which is connected in a closed superconducting loop. The gate conductors of two such devices are connected in parallel with a current supply source and the division of current between these two gates, and, therefore, the stable state of the circuit, is controlled by selectively establishing persistent currents in one or the other of the two loops. In a first embodiment of the invention a bistable circuit is provided having two input terminals each of which is connected to a drive line which is effective when energized by an input signal to cause a persistent current to be established in a corresponding one of the superconductor loops. Each of the drive lines is magnetically coupled to the corresponding loop and, therefore, causes a current to be induced in a first direction in the loop when an input signal is initially applied and a persistent current to be established in an opposite direction when the input signal on this drive line is terminated. In order that switching of the circuit from one stable state to the other be initiated only when the input signal is terminated, each of the gate conductors is subjected to a continuously applied bias field which opposes the field applied to the associated gate conductor by a current induced in the associated loop when an input signal is first applied and adds to the field produced by the persistent current stored in that loop.

In accordance with a second embodiment of the invention, a binary input trigger circuit is provided by employing to advantage this combination of persistent current loop and bias field to render the circuit responsive only to the trailing, or terminating, edge of an input signal. In this binary input trigger, the circuit arrangement is such that, when the circuit is in either of its stable states, a portion of one of the superconductor loops is maintained resistive so that, upon application of an input signal, a persistent current is established only in the other loop which causes the circuit to switch to its other stable state. When the circuit has been thus switched, a persistent current in this loop is destroyed by driving a portion thereof resistive. This status is maintained so that the next applied input signal is effective to establish a persistent current in the other loop and thereby cause the circuit to be switched back to its original condition. In the above described circuit, both of the superconductor gates and the entire paths in which the supply current flows remain in a superconductive condition when the circuit is in either of its stable states. As a result, the supply current may be interrupted when the circuit is in either stable state and subsequently restored without destroying the information stored in the trigger circuit. As a further incident to this type of operation, the circuit does not require that all of the current from the source be flowing in one gate when the circuit is in either one of its stable states but, rather, each stable state may be represented by having a majority of the supply current flow in one gate and a minority in the other.

In accordance with other embodiments of the invention, binary input triggers are provided wherein a portion of one of the parallel paths is held resistive when the circuit is in either of its stable states so that the circuit is positively held in this state with all of the current from the source flowing in the other parallel path. In these embodiments, the bias field is realized by connecting bias current sources directly to the superconductor loops so that a single control conductor carries both a bias current and the persistent current established by the input signals. In one such embodiment, a connection is made from each of the parallel paths to one of the superconductor loops and the source or supply current and the bias current are both caused to flow through the same control conductor to maintain the circuit in whichever stable state it has been caused to assume.

Therefore, another objects of the invention is to provide a superconductor binary input trigger circuit responsive only to the trailing edge of an input pulse.

A further object is to provide a superconductor binary input trigger circuit having first and second superconductor gate conductors connected in parallel circuit relationship with a current source and a control conductor for each gate conductor, wherein the control conductors are connected in separate superconductor loops in which persistent currents are established to control the state of the circuit and switching of the circuit from one stable state to the other.

A further object is to provide a circuit of the last described type wherein bias magnetic fields are continuously applied to both gate conductors and, more specifically, to such a circuit wherein the bias fields are realized by causing bias currents to flow through the control conductors connected in the persistent current loops.

Still another object is to provide a bistable superconductor circuit having first and second superconductor gates connected in parallel circuit relationship with a current source, wherein the state of the circuit once assumed is maintained by a combination of bias and source current flowing through a control conductor arranged in magnetic field applying relationship with one of the gates.

A feature of the invention lies in the provision of a superconductor circuit comprising first and second parallel paths and capable of assuming first and second stable states wherein both of the paths are entirely superconductive when the circuit is in either of its stable states.

Another feature of the invention lies in the provision of a bistable superconductor circuit comprising first and second paths connected in parallel with a current source, wherein each of the stable states is represented by having a major portion of the current from the source flow in one of the paths and a minor portion of the current from the source flowing in the other path.

Other objects of the invention will be pointed out in the following description and claims and illustrated in the accompanying drawings, which disclosed, by way of example, the principle of the invention and the best mode, which has been contemplated, of applying the principle.

In the drawings:

FIG. 1 is a plot depicting the magnetic field-temperature transition characteristics for a number of superconductor materials.

FIG. 2 depicts the magnetically induced transition characteristic of a sample of tantalum held at a temperature of 4.2° K.

FIG. 3 shows a wire wound cryotron having a single control coil.

FIG. 3*a* is a schematic representation of the cryotron of FIG. 3.

FIG. 4 shows a wire wound cryotron having a pair of superimposed control coils.

FIG. 4*a* is a schematic representation of the cryotron of FIG. 4.

Figure 5:
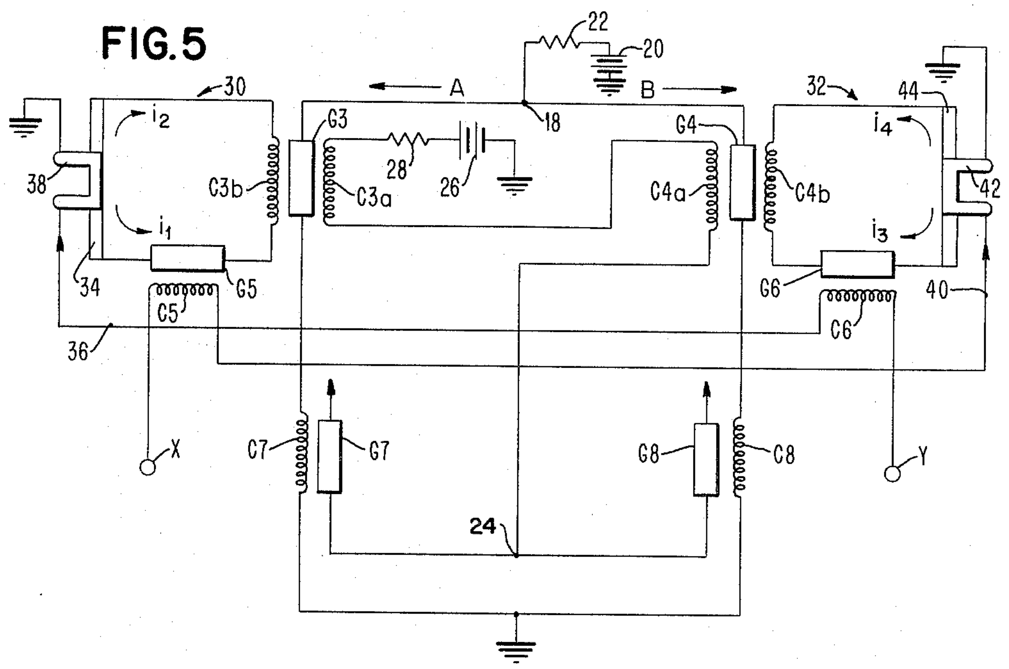

FIG. 5 is a diagrammatic representation of a bistable trigger circuit constructed in accordance with the principles of the invention.

FIG. 6 is a diagrammatic representation of one of the persistent current loops employed in the circuit of FIG. 5.

Figure 7:
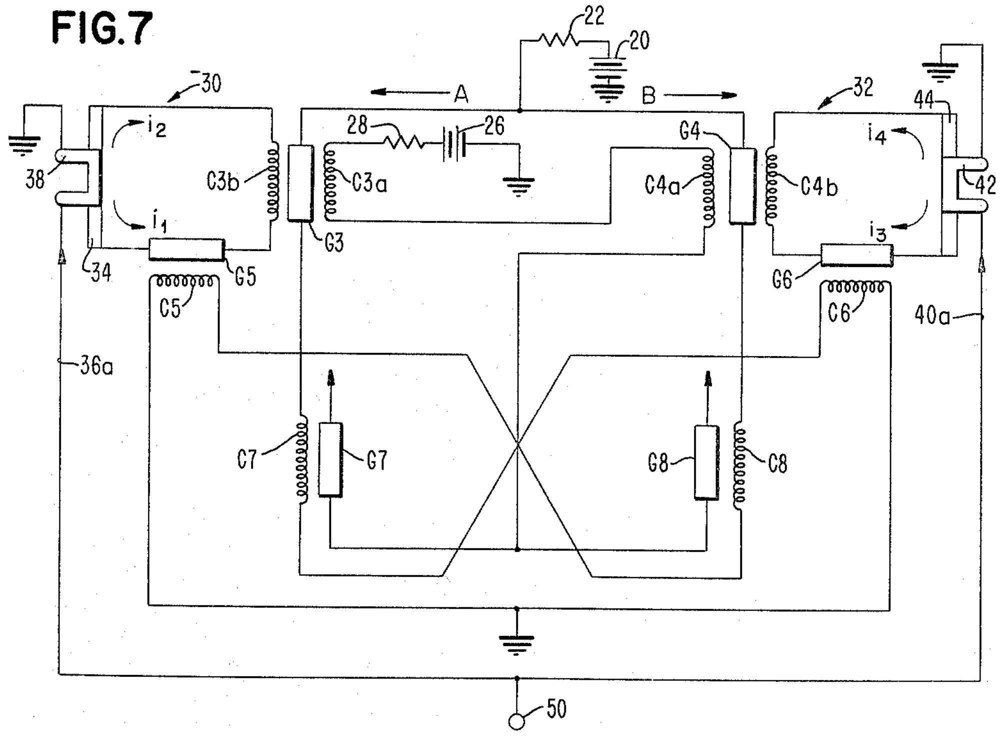
Figures 8, 9:
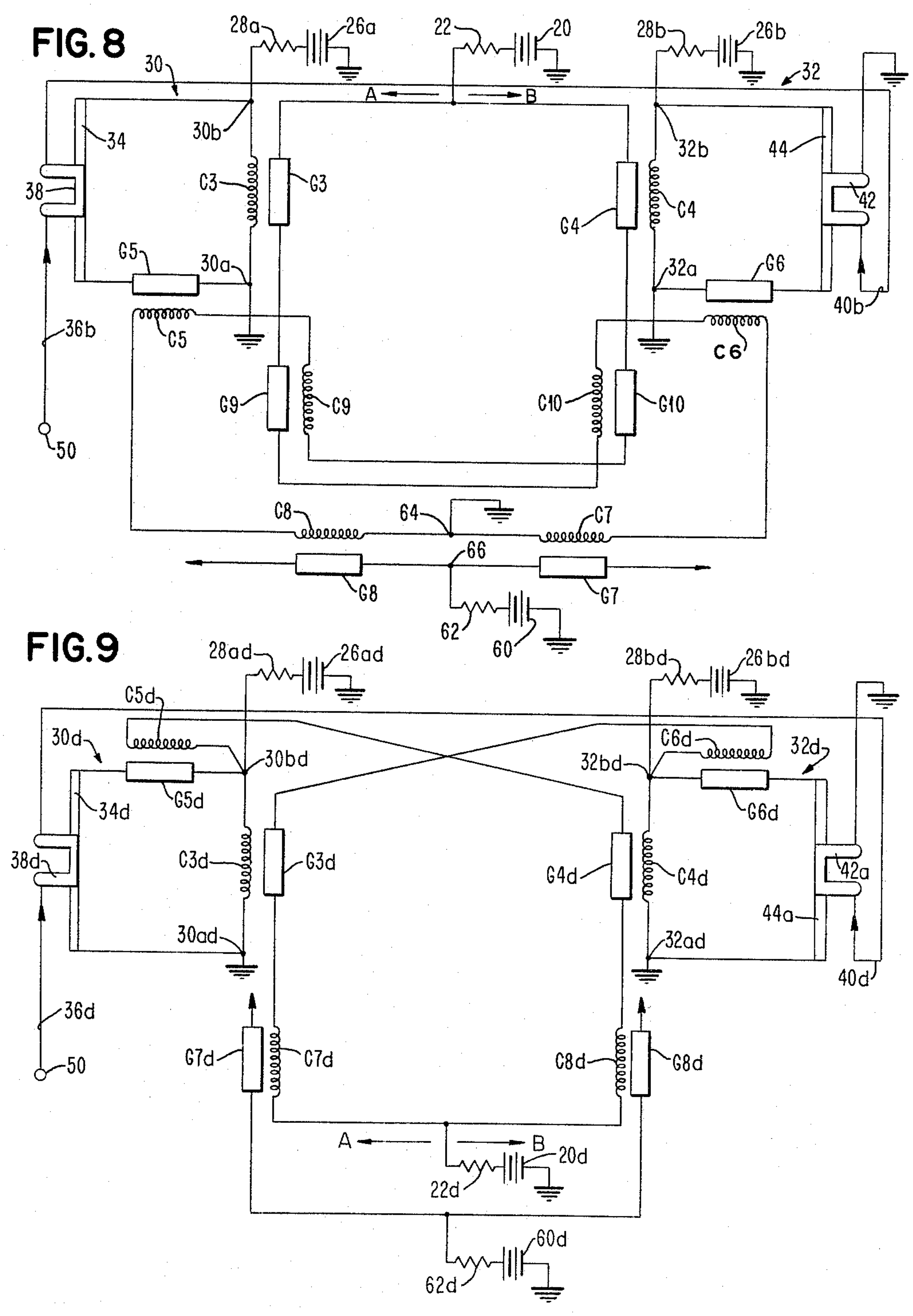

FIGS. 7, 8, and 9 are diagrammatic representations of binary input circuits constructed in accordance with the principles of the invention.

There is shown in FIG. 1 a plot depicting the transition temperatures (T) for a plurality of materials in the presence of different intensities of magnetic field (H). For example, tantalum (Ta) is shown to undergo a transition from a normal to a resistive state at approximately 4.4° K. when no magnetic field is present. This transition temperature is lowered as magnetic fields of increasing intensity are applied to the material. The state of the various materials, superconductive or normal, for different temperature-field conditions is ascertained by whether the particular condition is to the left or right of the curve for the material; for temperature-field conditions which are represented to the left of the curve, the material is superconductive and, for those to the right of the curve, the material is in a resistive or normal state. The curve for any material may vary somewhat according to the purity of the sample used and the manner in which it is prepared. For example, considering tantalum maintained at a temperature of 4.2° K., which is a convenient temperature since it is the temperature at which liquid helium boils at atmospheric pressure, the material remains in a superconductive state as long as the intensity of magnetic field to which it is subjected is below a transition field which may vary for different samples from about 50 to 100 oersteds. For the illustrative purposes of this disclosure, the tantalum employed is considered to have a threshold field of 50 oersteds at a temperature of 4.2° K. When this value of field intensity is exceeded, superconductivity in the material is quenched, that is, the material undergoes a transition from the superconductive to the normal state. From the plot it also appears that at this operating temperature both lead and niobium remain in a superconductive state in the presence of fields having an intensity much greater than the threshold field for tantalum. Niobium, in the absence of a magnetic field, has a transition temperature of approximately 8° K., and at 4.2° requires a threshold field in excess of 1000 oersteds to switch it from a superconductive to a normal state. For the illustrative purposes of this disclosure only, and not by way of limitation, the cryotrons hereafter discussed will be considered to be maintained at an operating temperature of 4.2° K. and to comprise tantalum gate conductors requiring a threshold field of 50 oersteds and niobium control conductors. Other operating temperatures and other combinations of materials may be employed. For example, at operating temperatures slightly below 3.72° K., which is the transition temperature for tin, cryotrons fabricated of tin gate conductors and lead control conductors may be employed. For more complete data on these and other superconductive materials and on apparatus for attaining temperatures in the vicinity of absolute zero, reference may be made to the above cited publications.

The nature of the transition between superconductive and normal states for a tantalum wire maintained at 4.2° Kelvin is indicated in FIG. 2. The abscissa of the plot represents the intensity of the magnetic field (H) applied to the tantalum and the ordinate represents the ratio of the actual resistance of the tantalum (R) to its resistance in a normal or resistive state (Ro). As indicated in the plot, the resistance remains essentially zero for field intensities below 50 oersteds. However, when the intensity of a magnetic field applied to the wire is increased above this threshold value, which is represented in the figure by the designation Hc, the tantalum undergoes a transition and assumes its normal or resistive state. The transition is reversible and the tantalum reassumes the superconductive state when the intensity of applied field is lowered below 50 oersteds. The transition occurs very rapidly and, as is indicated by the curve, sharply defines the normal and resistive states for the tantalum.

FIG. 3 is a diagrammatic representation of a cryotron such as is shown and described in the above-cited article by Dudley Buck. The cryotron comprises a gate conductor G of tantalum about which is wound a single coil C of niobium. As is also indicated in the cited article, cryotrons may be fabricated utilizing a plurality of superimposed control windings each of which, when energized, applies a magnetic field to the tantalum gate so that the net field applied to the gate is actually the sum or difference of these individual fields according to whether they are applied in the same or in opposite directions. An arrangement of this type is shown in FIG. 4, the two superimposed coils embracing gate G being designated C1 and C2.

During the operation of cryotrons in circuitry such as is about to be described, current is often caused to flow through a cryotron gate conductor at the same time at which energizing currents are applied to one or more control conductors. This gate current produces a magnetic field which is at right angles to the field applied by the control coil or coils. The field intensity adjacent the gate element in such a case is determined by quadrature addition of the coil and gate fields. In order that the cryotrons be usable in circuits in which one drives the other, they must be fabricated to have current gain and, for this reason, the effect of the self field of the gate relative to the field applied by the coil is kept at a minimum. Though it is recognized that the self field of the gate conductor must be considered in determining the actual field intensity of magnetic field applied thereto at any instant, in order to facilitate the explanation of the circuitry about to be described, only the fields applied by a coil or coils associated with each gate will be considered. For a fuller explanation of quadrature addition of fields produced by current in gate and control conductors, reference may be made to copending application, Serial No. 677,239, filed August 9, 1957, now U.S. Patent No. 3,015,041, in behalf of D. R. Young and assigned to the assignee of this application.

In the description of the circuits about to be given wherein cryotrons of the type shown in FIGS. 3 and 4 are employed by way of illustration, the cryotrons are represented schematically as shown in FIGS. 3A and 4A to simplify the showing of the various circuit connections. It should be here noted that the invention may be also practiced employing high speed wire wound and film type cryotrons such as are shown and described in copending application, Serial No. 625,512, filed November 30, 1956, in behalf of R. L. Garwin and assigned to the assignee of this application.

FIG. 5 is a schematic representation of the manner in which a superconductor flip flop or trigger circuit may be constructed in accordance with the principles of the invention. A flip flop or trigger is a circuit which is capable of assuming two distinguishably different stable states. In the circuit of FIG. 5, these two stable states are represented by the distribution of current between two current paths, A and B. These paths extend in parallel circuit relationship from a terminal 18 which is connected to a current source represented by a battery 20 and resistor 22. The distribution of current between these paths is controlled by controlling the condition, resistive or superconductive, of a pair of cryotron gates, G3 and G4, one of which is connected in each path. For example, when gate G3 is superconductive and gate G4 is held resistive by the application of a magnetic field in excess of its critical field, all of the current from the battery 20 is diverted through path A. Conversely, in the second stable state of the trigger, gate G4 is superconductive and gate G3 is held resistive so that the current is maintained in path B. Each of the gates G3 and G4 is provided with a pair of superimposed windings C3*a* and C3*b*, and C4*a* and C4*b*, respectively. These windings are arranged in the manner shown in FIG. 4 and are employed to apply the magnetic fields necessary to selectively drive one or the other of the gates resistive. Windings C3*a* and C4*a* are connected in a series circuit extending between a terminal 24 and current source represented by a battery 26 and resistor 28. The pitch of these windings, and the series connected current source are designed so that the windings C3*a* and C4*a* are continuously effective to apply to gates G3 and G4, respectively, bias fields which are somewhat less than the critical field H*c* required to drive these gates resistive. The effect of the continuous application of such bias fields is to lessen the field necessary to be applied by coils C3*b* and C4*b* to drive the gates resistive when the fields applied by these coils is in the same direction as that of the bias fields and to increase the field which must be applied by the windings C3*b* and C4*b* to drive the associated gates resistive when the applied field is in a direction opposite to the bias field direction.

Coils C3*b* and C4*b* are connected in closed loops 30 and 32 respectively and are energized to apply magnetic fields to their associated gates by persistent currents which are established in these loops. A closed loop of this type is shown in FIG. 6. The loop includes the winding C3*b*, a cryotron gate G5, and an input section or segment 34 which is arranged adjacent to a segment 38 connected to a drive line 36 to which signals for controlling the loop are applied. The entire loop 30 including coils C3*b* and gate G5 is made of superconductive materials. The segment 34 may be made of a soft superconductive material so that it may be driven resistive by a relatively small applied magnetic field. If, with no current in the loop and gate G5 superconductive, a signal is applied to line 36 to cause current to flow in the direction indicated, a magnetic field is built up in the vicinity of segment 34. The segments 38 and 34 are arranged so that this field links the segment 34 and, therefore, causes a current to be induced in the loop in the counterclockwise direction indicated by arrow $i_1$. As long as the field in the vicinity of segment 34 is insufficient to cause the segment to be driven resistive either by the direct application of the field or the induced self current, the current $i_1$ builds up linearly with the magnetic field. The magnitude of the current must be such that, as the applied field from current in line 36 is built up, the current $i_1$ establishes an opposing field which prevents any net change in the amount of flux linking loop 30. However, when the applied field has increased sufficiently to cause the field in the vicinity of the segment 34 to exceed the critical field for the superconductive material employed, segment 34 becomes resistive and dissipates the current being induced in the loop. This dissipation heats the segment 34 and causes this segment to remain in a normal state for a time which depends upon the thermal relaxation time of the segment in the environment. Since the net flux linking a completely superconductive loop cannot be changed without quenching superconductivity in at least a portion of the loop, the subsequent termination of the input signal causes the flux threading the loop when segment 34 becomes superconductive to be trapped. This trapped flux is accompanied by current $i_2$ which is induced in the loop as the input signal is being terminated and persists thereafter until some resistance is introduced in the loop. In order to obviate the possibility that this induced persistent current may exceed the critical Silsbee current for the segment 34, the input current signal may be terminated slowly or, immediately after the critical field for segment 34 is exceeded, may be decreased to a value below the critical current while the segment is still resistive, maintained at this value until the segment again becomes superconductive, and then terminated.

During the above described operation, fields are applied to gate G3 by coil C3*b* first in one direction when current $i_1$ flows as the applied field is built up and secondly in the opposite direction as the applied field is collapsed and current $i_2$ is induced. Since this latter current persists, a field is continuously applied by coil C3*b* to gate G3 in this opposite direction until the persistent current is destroyed by introducing resistance in the loop. The superimposed coils C3*b* and C3*a* and the current through these coils is such that the field initially applied by coil C3*b*, due to current $i_1$, opposes the bias field of coil C3*a*, therefore allowing gate G3 to remain superconductive. However, the field applied by coil C3*b*, due to current flow $i_2$, adds to that supplied by bias coil C3*a* and the magnitudes of these fields are such that the critical field for gate G3 is exceeded. Since the bias field is continuously applied and the current $i_2$ is persistent, gate G3 is held resistive by these additive fields until either the bias or persistent current is interrupted. The persistent current in the loop may be interrupted merely by energizing a coil C5 associated with gate G3 to drive this gate resistive. The resistance thus introduced into the loop dissipates the persistent current stored therein and, since there is essentially no flux linkage between coil C5 and the loop, no new current is stored when the signal on this coil is terminated.

Particular note should be made here of the characteristics of a signal which may be applied to line 36 to accomplish the establishing of a persistent current in loop 30 which maintains the gate G3 resistive. The input signal must first reach a magnitude sufficient to cause the critical field for segment 34 to be exceeded so that this segment is driven resistive. Thereafter, the input signal is decreased to a level below the critical value for this segment before it again assumes a superconductive state and is finally terminated to induce a persistent current after segment 34 has reassumed a superconductive state. Thus, a signal of relatively brief duration applied to line 36 may be effective to cause gate G3 to be driven resistive and be maintained resistive even after the signal is terminated. Further, it should be here noted that this result may be realized without the use of a bias coil by inducing sufficient current in loop 30. However, when this is done, the gate G3 is driven resistive both by the leading and trailing edges of the input signal and may undergo two such transitions, or only one, as the input signal is applied, according to whether its thermal relaxation time is shorter or longer than the duration of the input signal. For further explanatory material on the manner in which persistent loop currents may be established and destroyed, reference may be made to the above cited book by Shoenberg and also to copending applications Serial No. 615,814 and Serial No. 615,830, both of which were filed on October 15, 1956, in behalf of R. L. Garwin and J. W. Crowe, respectively.

Referring now to FIG. 5, the operation of the trigger circuit there shown may be readily understood. Assume that a persistent current has been established in loop 30 in the manner described above and that, therefore, gate G3 is in a resistive state. The drive line 36 is coupled to a terminal Y at which the input signal which drives gate G3 resistive is applied. There is also connected in this circuit a coil C6 which embraces a gate G6. This gate is connected in loop 32 and the application of the signal at terminal Y, which causes gate G3 to be set in a resistive state, also momentarily drives gate G6 resistive to thereby destroy any persistent current in loop 32 and ensure that gate G4 is in a superconductive state. Therefore, with gate G3 resistive and gate G4 superconductive, all of the current from battery 20 is in path B and the flip flop is in what may be termed its second stable state. The paths A and B have connected therein output coils C7 and C8 which coils respectively embrace gates G7 and G8. With the flip flop in its second stable state, gate G8 is resistive and gate G7 superconductive and the state of the circuit is, therefore, manifested by observing the resistance of these two gates or, as indicated, the two gates in parallel may be connected in series with the bias circuit so that the current from battery 26 passes through gate G7 when the flip flop is in its second stable state and through gate G8 when the flip flop is in its first stable state.

This first stable state is achieved by applying an input signal at a terminal designated X. This terminal is connected to a drive line 40 which includes a segment 42 arranged adjacent a segment 44 in loop circuit 32. The circuit coupled to terminal X also includes coil C5 which, when energized by the signal applied to this terminal, drives gate G5 resistive to thereby destroy the persistent current in loop 30. Coil C3*b* is thus deenergized and gate G3 becomes superconductive when the signal is initially applied at terminal X. The operation is thereafter the same as that described with reference to loop 30; a current $i_3$ is first induced in loop 32; then segment 44 is driven resistive after which the input signal is decreased in magnitude and then levelled off until segment 44 again assumes a super-conductive state; and finally the input signal is terminated to induce a persistent current in this loop and thereby energize coil C4*b*. This coil then applies to gate G4 a field which adds to that of bias coil C4*a* to drive the gate resistive. Since gate G4 is now resistive, all of the current from battery 20 shifts into path A and the trigger assumes its first stable state. Since the input signal establishes in loop 32 a persistent current which maintains coil G4*b* energized and thus gate G4 resistive, the duration of the input signal required to shift the circuit from one stable state to the other is independent of the time it takes to shift the current from path B to path A. Thus, a relatively short pulse may be applied at the proper one of the terminals X, Y to shift the circuit from one stable state to the other. The gate G3 or G4, which is associated with the loop to which the input signal is applied, is driven resistive and is maintained resistive by the persistent current stored in that loop and current from battery 20 shifts to the other path and the circuit is locked in this stable state until another signal is applied at the other input terminal. Further, since this positive means of holding the circuit in either stable state is achieved without adding coils in the actual circuit in which the current from battery 20 is being shifted, the *L/R* time constant of this circuit is relatively small compared to that of flip flop circuits which employ cross coupled regenerative type connections to accomplish this function.

Referring now to FIG. 7, there is shown, schematically, a binary input trigger or flip-flop circuit, that is, a circuit capable of assuming first and second distinguishably different stable states and of being switched successively back and forth between these states in response to the application of a series of like signals applied at a single input terminal. The circuit of FIG. 7 may be similar to that of FIG. 5 in the structure and connections utilized and, for this reason, the same character designations are employed to identify corresponding components in both figures. The basic difference between the two circuits lies in the input circuitry to which the signals for switching from one stable state to the other are applied. The terminals X and Y of FIG. 5 are replaced by a single input terminal 50 which has connected thereto in parallel circuit relationship drive lines **36*a* and 40*a* which are connected respectively to the input drive segments 38 and 42. When an input signal is applied at terminal 50, the current divides evenly between these two paths since both are completely superconductive and have essentially equal inductances. The segments 38 and 42 may be connected in series circuit relationship with the input terminal as is illustrated in other embodiments of the invention later to be described. The binary input circuit of FIG. 7 further differs from that of FIG. 5 in that the coils C5 and C6 which, when energized, respectively drive gates G5 and G6 resistive to destroy persistent currents in loops 30 and 32**, are connected in the circuit of FIG. 7 in paths B and A, respectively, instead of in the circuitry to which the input signals are applied as is done in the circuit of FIG. 5.

A further distinction between the two circuits is that in the circuit of FIG. 7 all of the current does not flow in one of the paths in each of the stable states but a majority of the current from battery 20, for example nine tenths, flows in one path when the trigger is in its first stable state and in the other path when the trigger is in its other stable state. This type of arrangement has no deleterious effects as far as realizing an output is concerned since the coil pitch of coils C7 and C8 are chosen so that each of these coils is effective to drive its respective gates G7 or G8 resistive when more than one half of the current from battery 22 is flowing in that coil. Thus, when the circuit is in either stable state, one of the gates G7 or G8 is resistive and the other is superconductive and, therefore, assuming each gate is connected through further superconductive circuitry to ground, all of the current from battery 26 is directed through the superconductive gate.

The operation of the circuit will now be described when a signal is applied at input terminal 50 to cause current flow in the directions indicated in drive lines 36*a* and 40*a* with the trigger in its first stable state, that is, with the majority of the supply current flowing in path A through gate G3 and coils C7 and C6. With this current in the latter coil, gate G6 is in a resistive state and there is, therefore, no persistent current in loop 32. Gate G4 is thus in a superconductive state but, since the parallel paths A and B form a closed loop of superconducting material, the current distribution with the nine tenths of the supply current in path A is maintained until resistance is introduced in the loop. The signal applied at terminal 50 and transmitted by drive line 36*a* to segment 38 causes a persistent current to be established in loop 30 in the same manner as was described above with reference to FIG. 5. The input signal is also transmitted by drive line 40*a* to segment 42 but, though the changing current through this segment causes currents to be induced in loop 32, these induced currents are quickly dissipated by gate G6 which is then being held resistive by the current in path A passing through coil C6. It should be here noted that the construction of coils C5 and C6 is such that each is effective to drive the embraced gate resistive only when the current therethrough is slightly less than nine tenths of the total supply current from battery 20. Therefore, when the input signal is applied with the circuit in its first stable state, gate G5 in loop 30 is in a superconductive state and a persistent current may be stored in this loop.

Thus, upon termination of the input signal, gate G3 is in a resistive state and gate G4 is in a superconductive state and the current begins to shift from path A to path B. This shifting of current continues until almost nine tenths of the current is in path B and is thus flowing through coil C5. At this point, gate G5 is driven resistive and dissipates the persistent current in loop 30, thereby allowing gate G3 to reassume a superconductive state. Gate G3 becomes superconductive when approximately nine tenths of the supply current is in path B and one tenth in path A and, once superconductivity is restored in gate G3, this current distribution for the second stable state of the trigger persists until another signal is applied at terminal 50. Upon the application of such a signal, a persistent current is established in loop 32 to drive gate G4 resistive and switch the circuit back to its first stable state. Note should be made of the fact that the final current distribution for the two stable states may be varied by varying the pitch of the control windings C5 and C6 or the magnitude of the current supplied by battery 20. In this way, the total amount of current necessary to be shifted to switch the circuit from one stable state to the other can be varied. The coils C7 and C8 are, of course, arranged so that, for the particular current distribution achieved, one of the gates G7 or G8 is in a resistive state and the other in a superconductive state for each of the stable states of the trigger circuit.

One advantage inherent in the trigger circuits of FIGS. 5 and 7 lies in the fact that the supply current may be interrupted without destroying the information stored in the trigger. In the circuit of FIG. 5, the state of the trigger is dependent upon the one of the loop circuits in which a persistent current has been established. Therefore, even if the supply and/or bias current are interrupted, the circuit, upon restoration of the current(s), reassumes the state it was in previous to the interruption. The same is true in the circuit of FIG. 7 except that in this circuit the ability to withstand an interruption in supply current without losing stored information is due to the fact that both of the paths A and B are completely superconductive when the circuit is in either of its stable states. Thus, when and if the supply current is interrupted, a persistent current is established in the closed loop which paths A and B form. The direction in which this persistent current flows depends upon which one of the paths is carrying the major portion of the supply current when the supply current interruption occurs. When the supply current is restored, the persistent current stored in the loop causes the circuit to reassume its initial condition with the majority of the current flowing in one of the paths.

A further embodiment of a binary input trigger circuit constructed in accordance with the principles of the invention is shown schematically in FIG. 8. This circuit is similar to that of FIG. 7 in many respects and, for this reason, the same designations have been employed to identify like components in both figures. The primary differences between the two circuits are first, a pair of cross coupled cryotrons have been added in the paths A and B; second, the single bias supply source of FIG. 7 is in FIG. 8 replaced by two separate sources represented respectively by battery 26*a* and resistor 28*a*, and battery 26*b* and resistor 28*b*; third, the coils C3*a* and C3*b* of the circuit of FIG. 7 are, in FIG. 8, replaced by a single coil C3 and the coils C4*a* and C4*b* by a single coil C4; fourth, each of the loops 30 and 32 are provided with a pair of terminals 30*a* and 30*b*, and 32*a* and 32*b*, respectively, with the terminals 30*a* and 32*a* being grounded and the terminals 30*b* and 32*b* being each coupled to one of the individual bias current sources.

The function of the cross coupled cryotrons added to the circuit of FIG. 8 is to cause all of the current from the supply source represented by battery 20 and resistor 22 to flow in one or the other of the paths A and B when the trigger is in one of its stable states. These cross coupled cryotrons comprise gates G9 and G10 which are connected in paths A and B, respectively, and coils C9 and C10 which embrace gates G9 and G10 and are connected in series in paths B and A respectively. Thus, the coil C9 is connected in series with gates G10 and G4, and the coil C10 is connected in series with gates G9 and G3. The added cryotrons are fabricated so that when more than half of the current from the supply source, for example six-tenths, is flowing through either coil, that coil is effective to drive the embraced gate resistive. When, for example, the trigger is being switched from its first stable state to its second stable state, that is, when the supply current is being shifted from path A to path B, coil C9 is effective to drive gate G9 resistive when six tenths of the current is in the latter path. This introduction of resistance into path A at this time ensures that all of the current from the battery 20 is shifted to path B and the shifting of current does not stop, as is the case in the circuit of FIG. 7, when nine-tenths of the current has been shifted and coil C5 is thereby rendered effective to drive gate G5 resistive and destroy the persistent current in loop 30. This cross coupling arrangement, with each path having a gate conductor which is connected in series with the coil for the corresponding gate in the other path, also positively locks the circuit in whatever stable state it is in. It should be apparent that this type of cross coupling arrangement shown in the circuit of FIG. 8 may be incorporated in the circuit of FIG. 7 without the further changes in the biasing arrangement also shown in FIG. 8.

Assume now that the trigger circuit is in its first stable state with all the current from the supply source in path A and, thus, flowing through gates G3 and G9 and coils C10, C6, and C7. The latter coil is one of the output coils and, with the current from the source flowing therethrough, holds gate G7 resistive so that the current from an output current source represented by a battery 60 and resistor 62 is directed through gate G8 to indicate the state of the circuit. This output current source may be eliminated by eliminating the ground connection to a terminal 64 and connecting this terminal directly to a terminal 66 with which gates G7 and G8 are connected in parallel. The gates G7 and G8 are connected through further superconducting circuitry to ground.

With coil C6 energized by the current in path A, gate G6 is held resistive so that all of the current from bias battery **26*b* flows from terminal 32*b* through coil C4 to the terminal 32*a* which is grounded. Since there is no resistance in loop 30, and considering as the worst case that where no resistance has been introduced in this loop since the bias battery 26*a* has been connected in the circuit, the current from this battery splits at terminal 30*b* in a ratio inversely proportional to the inductances of the two sections of the loop connecting terminals 30*b* and 30*a*. However, even were the current in the loop distributed in this way, upon the application of an input signal at terminal 50, and thus to drive lines 36*b* and 40*b*, here connected in series, the segment 34 is driven resistive causing all of the current from source 26*a* to flow through coil C3. Since gate G6 in loop 32 is resistive, the input signal applied at terminal 50, though it does cause segment 44 to be driven resistive, induces only transient currents in this loop which are quickly dissipated. However, as before, when the input signal on drive line 36*b* is terminated, a persistent current is established in loop 30 and this current adds to the current supplied by bias battery 26*a* to coil C3 so that the field then applied by the coil to the embraced gate G3 drives this gate resistive and causes the trigger to begin to shift the supply current from path A to path B. When approximately six-tenths of the current has been shifted to path B, coil C9 drives gate G9 resistive so that the current continues to shift after the current in path B has increased sufficiently to render coil C5 effective to drive gate G5 resistive and thereby cause the persistent current in loop 30 to be dissipated. When the next input signal is applied at terminal 50, a persistent current is induced in loop 32 which adds to the bias current from battery 26*b*** in coil C4 to drive gate G4 resistive and thereby initiate the switching of the trigger back to its first stable state.

It should be here noted that once all of the bias current from batteries **26*a* and 26*b* has been initially established in coils C3 and C4, respectively, the entire bias current remains in these coils since the circuit paths from terminal 30*b* through coil C3 to terminal 30*a* and from terminal 32*b* through coil C4 to terminal 32*a*** always remain completely superconductive. Further note should be made of the fact that the biasing arrangement of FIG. 8 may be substituted in the circuit of FIG. 7 without the addition of the cross coupled cryotrons, in which case, of course, only a majority of the supply current flows in one or the other of the paths when the circuit is in either of its stable states. The circuit arrangement of FIG. 8 whereby current addition from two sources in a single control coil is employed to control the state of a gate embraced by the coil is advantageous in that it is easier to fabricate single coil cryotrons than cryotrons having two or more superimposed control coils.

Another embodiment of a binary input trigger circuit, constructed in accordance with the principles of the invention, is shown diagrammatically in FIG. 9. In this figure, though the basic circuit arrangement is similar to that of the previously described embodiments, the changes that have been made necessitate design considerations not present in the other embodiments and, for this reason, corresponding functional components are identified, where possible, using the same reference numerals with the letter "*d*" appended. The basic difference between the circuit of FIG. 8 and that of FIG. 9 is that, in the latter, the cross coupled cryotrons G9, C9 and G10, C10 used in FIG. 8 have been removed and the paths A and B are connected through loops **32*d* and 30*d*, respectively, to ground. First, consider the circuit to be in its first stable state with all of the supply current from battery 20*d*** flowing in path A and, therefore, through coils C7*d*, gate G3*d* and coil C6*d* to terminal **32*bd* and thence through loop 32*d*** to ground. In the illustrative embodiment of FIG. 9, coils C7*d* and C6*d*, as well as coils C8*d* and C5*d*, are arranged with a pitch such that each of the coils is effective to drive the embraced gate resistive when nine tenths of the current from the supply source is flowing through it. Therefore, with the entire supply current in path A, gate G7*d* is maintained resistive to cause all of the output indicating current to be directed through gate G8*d*. With gate G6*d* being maintained resistive, all of the supply current in path A flows directly from terminal **32*bd*** through the completely superconductive path including coil C4*d* to terminal **32*ad* and ground. This current flow is in the same direction as that supplied by the bias battery 26*bd* connected to terminal 32*bd*. In this illustrative embodiment, batteries 26*bd* and 20*d*** and the pitch of coil C4*d* is designed so that the total current from either of these current sources, when flowing through coil C4*d*, renders this coil effective to apply to gate G4*d* a field in intensity equal to 0.6 of the critical field H*c* required at the operating temperature to drive the gate from a superconductive to a resistive state (see FIG. 2). Thus, with the circuit in its first stable state, gate G4*d* is subjected to a field in intensity equal to 1.2 H*c*, and is, therefore, maintained resistive. Gate G3*d* is at this time subject only to a bias field of 0.6 H*c* due to the flow of bias current from battery **26*ad*** through coil C3*d* and, therefore, the circuit is maintained in its first stable state.

When an input pulse is applied at terminal 50 and thus to drive lines **36*d* and 40*d***, the resistance of gate G6*d* prevents any persistent currents from being established in loop **32*d***. However, since gate G5*d* is in a superconductive state, a persistent current is established in loop **30*d*** upon termination of the input signal. The design is such that this persistent current is sufficient, of itself, to render coil C3*d* effective to apply to gate G3*d* a field in intensity equal to 0.6 H*c*. Therefore, at this moment, both of the gates G3*d* and G4*d* are in a resistive state and the supply current begins to divide between the two paths A and B. When the current redistribution has reached a point where half of the supply current is flowing in each path, the total field applied to gate G4*d* is 0.9 H*c* and this gate is, thus, superconductive. The supply current, therefore, continues to shift from path A to path B. As this is occurring, the amount of supply current entered in loop **30*d* at terminal 30*bd* is increasing. Since the entire loop is, at this time, superconductive, this current will split between the two parallel paths to terminal 30*ad*** inversely in proportion to the inductance of these two paths, so that the net flux threading the now completely superconductive loop remains unchanged. The portion of the supply current in coil C3*d* flows in the same direction as the persistent and bias current in the coil. When approximately nine-tenths of the current from battery **20*d*** has been shifted, coil C5*d* drives gate G5*d* resistive to destroy the persistent current in the loop **30*d*. At this time, the portion of the supply current which was then being directed from terminal 30*bd*** through this gate is diverted to flow through coil C3*d* so that the coil now carries both the entire bias current from battery **26*ad* and nine-tenths of the supply current from battery 20*d***. Gate G3*d* is, therefore, maintained resistive and the supply current continues to shift until it is entirely in path B. The circuit is maintained stably in this condition since gate G3*d* is maintained in a resistive state and gate G4*d* is superconductive. When the next input signal is applied at terminal 50, the operation is essentially the same to switch the supply current from path B to path A, gate G4*d* being driven resistive by the combination of bias and persistent current in loop 32*d* and then maintained in this state by the combination of bias and supply current in this coil.

It should be noted that the values of applied field achieved by the combination of coil pitch and current flow employed in the illustrative embodiment may be varied and that it is not necessary that the bias, supply, and persistent currents be equal.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a superconductor circuit, a current source, first and second superconductor gate conductors connected in parallel circuit relationship with respect to said source and maintained at an operating temperature below the temperature at which they undergo transitions between normal and superconductive states in the absence of a magnetic field, first and second superconductor control conductors for applying magnetic fields in the vicinity of said first and second gate conductors, respectively, first and second superconductor segments, superconductor means connecting said first segment and said first control conductor in a first closed loop and said second segment and said second control conductor in a second closed loop, each of said loops being entirely superconductive at said operating temperature in the absence of a magnetic field, said first and second control conductors being capable of remaining in a superconductive state for conditions under which said first and second segments are in a normal state; and means for causing persistent currents to be established in said loops to thereby control the distribution of said source current between said parallel connected gate conductors comprising, first means for applying magnetic fields in the vicinity of said first segment and second means for applying magnetic fields in the vicinity of said second segment.

2. The circuit of claim 1 wherein there are provided first and second bias means associated respectively with said first and second gate conductors for causing bias magnetic fields to be applied in the vicinity of said respective gate conductors.

3. The circuit of claim 2 wherein said first bias means comprises a third control conductor associated with said first gate conductor and said second bias means comprises a fourth control conductor associated with said second gate conductor.

4. The circuit of claim 2 wherein said first and second bias means comprise current supply means for causing current flow in said first and second control conductors, respectively.

5. In a superconductor circuit, first and second superconductor gate conductors connected in parallel circuit relationship, first and second superconductor loops including, respectively, first and second control conductors for applying magnetic fields to said first and second gate conductors, respectively, first magnetic field applying means associated with a portion only of said first loop removed from said first control conductor for causing persistent currents to be established in said first loop, second magnetic field applying means associated with a portion only of said second loop removed from said second control conductor for causing persistent currents to be established in said second loop.

6. In a superconductor circuit, a plurality of superconductor gate conductors connected in parallel circuit relationship, a plurality of superconductor loops each associated with a corresponding one of said gate conductors and each including a control conductor for applying magnetic fields in the vicinity of the corresponding gate conductor, and a plurality of magnetic field applying means each associated with a corresponding one of said loops and each effective when energized and deenergized to establish a persistent current in the corresponding loop, each of said magnetic field applying means being effective when so energized and deenergized to cause a portion only of the corresponding loop removed from the control conductor therein to undergo transitions from a superconductive to a normal state and thence back to a superconductive state.

7. In a superconductor circuit including first and second superconductor gate conductors connected in parallel circuit relationship and capable of being caused to assume a first stable state wherein current from said source divides between said gate conductors in a first predetermined relationship and a second stable state wherein current from said source divides between said gate conductors in a second predetermined relationship, means for switching the circuit from the stable state it is in to the other stable state in response to the application of each of a series of signals applied at one terminal comprising in combination, first and second superconductor persistent current storage loops coupled to said terminal and associated with said first and second gate conductors, respectively, each of said loops being effective when persistent current is stored therein to apply magnetic fields to the associated gate conductor, and bias means for causing biasing magnetic fields to be applied to said first and second gate conductors.

8. The circuit of claim 7 wherein the field applied to the associated gate conductor when persistent current is stored in either of said loops is insufficient of itself to drive said associated gate conductor into a resistive state and each of said bias fields applied to said gate conductors is of itself insufficient to drive the gate conductor into a resistive state, but the combination of bias field and field applied to one of said gate conductors when persistent current is flowing in the associated loop is sufficient to drive that gate conductor from a superconductive to a resistive state.

9. In a superconductor circuit including first and second superconductor gate conductors connected in parallel circuit relationship and capable of being caused to assume a first stable state wherein current from said source divides between said gate conductors in a first predetermined relationship and a second stable state wherein current from said source divides between said gate conductors in a second predetermined relationship, means for switching the circuit from the stable state it is in to the other stable state in response to the application of each of a series of signals applied at one terminal comprising in combination, first and second superconductor loops including respectively first and second control conductors for applying magnetic fields to said first and second gate conductors, respectively, first and second drive lines each magnetically coupled to an associated one of said first and second loops, respectively, each of said drive lines being connected to said terminal and effective when input signals are applied to cause a portion of the associated loop other than the control conductor therein to undergo transitions between superconductive and normal states.

10. The circuit of claim 9 wherein there are also provided first and second bias means for causing magnetic biasing fields to be applied to said first and second gate conductors, respectively.

11. A superconductor circuit for controlling a gate conductor between resistive and superconductive states comprising, control conductor means for applying magnetic fields to said gate conductor; first means for causing current flow in said control conductor means comprising a superconductor loop in which at least a portion of said control conductor means is connected and means for establishing persistent currents in said loop; and second means for causing current flow in said control conductor means comprising current supply means connected to at least a portion of said control conductor means.

12. The circuit of claim 11 wherein said control conductor means comprises a first control conductor connected in said superconductor loop and a second control conductor connected to said current supply means.

13. The invention as claimed in claim 11 wherein said control conductor means comprises a single control conductor connected in a superconducting loop and to said current supply means.

14. In a superconductor circuit, a superconductive gate conductor, a superconductor control conductor for applying magnetic fields to said gate conductor, means connecting said control conductor in a superconductor loop, drive means magnetically coupled with said loop effective when a signal current therethrough is initiated to induce a current in a first direction in said loop and when said signal current is terminated to cause a persistent current in a direction opposite to said first direction to be stored in said loop, and means for rendering said gate conductor responsive to undergo a transition from a superconductive to a resistive state only when said signal is terminated comprising means for causing a biasing field to be applied to said gate conductor.

15. A superconductor circuit for controlling a first superconductor gate conductor between resistive and superconductive states comprising, a superconducting loop, a control conductor for applying magnetic fields to said first gate conductor connected in said loop, a second superconductor gate conductor connected in said loop, means for establishing persistent current in said loop, and means comprising current supply means coupled to a second control conductor for applying magnetic field to said second gate conductor to thereby destroy the persistent current stored in said loop, said supply means being also connected to a junction in said loop for supplying current to said first control conductor.

16. A superconductor circuit for controlling a first superconductor gate conductor between resistive and superconductive states comprising, a first control conductor for applying magnetic field to said first gate conductor, a second superconductor gate conductor, a second control conductor for applying magnetic field to said second gate conductor, superconductor means connecting said first control conductor and said second gate conductor in a closed superconductor loop, means for causing persistent currents to be established in said loop, and a current source connected to said first and second control conductors.

17. A circuit for controlling a superconductor gate conductor between resistive and superconductive states comprising, means effective in response to an input signal to apply to said gate conductor a magnetic field in a first direction when said input signal is initially applied and a magnetic field in a second direction when said input signal is terminated, and means for causing to be continuously applied to said gate conductor a biasing field which adds to the field in one of said directions applied by said means responsive to said input signal and subtracts from the field in the other of said directions applied by said means responsive to said input signal.

18. A superconductor circuit responsive only to the termination of an input signal comprising a superconductor gate conductor, control means effective in response to said input signal to apply to said gate conductor a magnetic field in a first direction when said input signal is initially applied and a magnetic field in an opposite direction when said input signal is terminated, and bias means for causing a biasing magnetic field in said opposite direction to be applied to said gate conductor.

19. The circuit of claim 18 wherein each of said fields in said first and opposite directions applied by said control means and said field applied by said bias means is of itself ineffective to cause said superconductor gate conductor to undergo a transition to a resistive state but said fields in said opposite direction applied by said control and bias means together are effective to cause said superconductor gate conductor to undergo a transition to a resistive state.

20. The circuit of claim 19 wherein said control means comprises, a control conductor arranged to apply magnetic field to said superconductor gate conductor and superconductor means connecting said control conductor in a closed superconductor loop.

21. The circuit of claim 20 wherein said bias means is connected to a terminal in said superconductor loop.

22. In a bistable superconductor circuit including two superconductor gate conductors connected in parallel circuit relationship with a current source, means for controlling the state of said circuit comprising first and second superconductor loops each effective when a persistent current is established therein to apply magnetic field to a coresponding one of said gate conductors, the first one of said loops having a persistent current therein when said bistable circuit is in a first one of its stable states and the second one of said loops having a persistent current therein when said bistable circuit is in the second one of its stable states, a single drive line associated with each of said loops effective when a signal is applied thereto when said bistable circuit is in either of said stable states to apply magnetic fields to a portion of each of said loops and thereby destroy the persistent current in the one of said loops then storing a persistent current and establish a persistent current in the other loop.

23. In a bistable superconductor circuit including two superconductor gate conductors connected in parallel circuit relationship with a current source, means for controlling the state of said circuit comprising first and second superconductor loops each effective when a persistent current is established therein to apply magnetic field to a corresponding one of said gate conductors, the first one of said loops having a persistent current therein when said bistable circuit is in a first one of its stable states and the second one of said loops having a persistent current therein when said bistable circuit is in the second one of its stable states, a drive line associated with each of said loops effective when a signal is initially applied thereto destroy superconductivity in at least a portion of each of said superconductor loops and effective when said signal is terminated to cause a persistent current to be established in only one of said loops.

24. In a bistable superconductor circuit including two superconductor gate conductors connected in parallel circuit relationship with a current source, means for controlling the state of said circuit comprising first and second superconductor loops each effective when a persistent current is established therein to apply a magnetic field to a corresponding one of said gate conductors, the first one of said loops having a persistent current therein when said bistable circuit is in a first one of its stable states and the second one of said loops having a persistent current therein when said bistable circuit is in the second one of its stable states, a drive line associated with each of said loops effective when a singal is initially applied thereto when said bistable circuit is in said first state to destroy the persistent current in said first loop and effective when said applied signal is terminated to establish a persistent current in said second loop.

25. In a bistable superconductor circuit including first and second superconductor gate conductors connected in parallel circuit relationship with respect to a current source, the current from said source dividing between said gate conductors in accordance with a first predetermined relationship when said bistable circuit is in a first one of its stable states and in accordance with a second predetermined relationship when said bistable circuit is in the second one of its stable states, first and second closed superconductor loops associated with said first and second gate conductors, respectively, and each effective when persistent current is flowing therein to apply a magnetic field to the associated gate conductor, third and fourth superconductor gate conductors connected in said first and second loops, respectively, and first and second control conductors associated with said third and fourth gate conductors, respectively, said first control conductor being connected in series with said second gate conductor and effective when said circuit is in said first stable state to maintain said third gate conductor in a resistive state, said second control conductor being connected in series with said first gate conductor and effective when said circuit is in said second stable state to maintain said fourth gate conductor in a resistive state.

26. The circuit of claim 25 wherein said current source is connected through said series connected first gate conductor and second control conductor to said second superconductive loop and through said second gate conductor and said first control conductor to said first superconductor loop.

27. The circuit of claim 25 wherein there are also provided current supply bias means connected to each of said loops.

28. A superconductor circuit comprising first and second superconductor gate conductors connected in parallel circuit relationship with respect to a current source, a first control conductor for applying magnetic fields to said first gate conductor, means supplying input current signals to said first control conductor, and means continuously supplying bias current to said first control conductor.

29. A superconductor circuit including first and second superconductor gate conductors connected in parallel circuit relationship with respect to a current source, and first and second control conductors for applying magnetic fields to said first and second gate conductors, respectively, said first and second control conductors being respectively connected in first and second closed super-conductor loops, said first loop being series connected to said second gate conductor and said second loop being series connected to said first gate conductor.

30. A superconductor circuit comprising first and second superconductor paths connected in parallel circuit relationship between a terminal and a current source, means for causing said circuit to assume a first stable state wherein a major portion of current flowing from said source to said terminal is in said first path and a minor portion in said second path, and means for causing said circuit to assume a second distinguishably different stable state wherein a major portion of current flowing from said source to said terminal is in said second path and a minor portion in said first path each of said paths being entirely super-conductive when said circuit is in either of said stable states.

31. In a superconductor circuit, a superconductor gate conductor capable of undergoing transitions between superconductive and resistive states, input means for said circuit for applying signals thereto to control the state of said gate conductor, a superconductor loop coupling said input means to said gate conductor, said superconductor loop including a control conductor adjacent said gate conductor for applying thereto a magnetic field in a first direction in response to a current in one direction in said loop and in an opposite direction in response to a current in the opposite direction in said loop, said input means being effective when applying a signal to said circuit to produce a current in said one direction in said loop when said signal is initially applied and to establish a persistent current in said opposite direction when said signal is terminated, the fields produced by each of said currents produced in said loop by said input means when applying a signal to said circuit being of themselves insufficient to drive said gate conductor from a superconductive to a resistive state, and further means for causing to be applied to said gate conductor a biasing magnetic field in one of said directions which combines with said fields produced by current in said super-conductor loop, said biasing magnetic field being of itself insufficient to drive said gate conductor from a superconductive to a resistive state but being effective with said field produced by said current in said loop in one of said directions when said input means applies a signal to said circuit to drive said superconductor gate conductor from a superconductive to a resistive state.

32. A persistent current device comprising a persistent current loop formed by first and second superconductive paths extending in parallel between first and second terminals; current supply means connected across said first and said second terminals; a control conductor connected in said first path; a gate conductor adjacent said control conductor and controlled thereby between superconducting and resistive states; magnetic field applying means coupled to said second path for establishing persistent current in said loop by momentarily introducing resistance into a segment of said second path and providing a net flux which links said loop when said segment becomes superconducting; said current from said current supply means combining with said persistent current in said first path of said loop to co-jointly control said gate conductor.

References Cited in the file of this patent

UNITED STATES PATENTS

| | | |
|---|---|---|
| 2,832,897 | Buck | Apr. 29, 1958 |
| 2,877,448 | Nyberg | Mar. 10, 1959 |
| 2,913,881 | Garwin | Nov. 24, 1959 |
| 2,966,598 | MacKay | Dec. 27, 1960 |
| 2,983,889 | Green | May 9, 1961 |

OTHER REFERENCES

"Some Experiments on a Supraconductive Alloy in a Magnetic Field," Caaimir-Jonker et al., Physica, vol. 2, 1935, pages 935–941.

"An Analysis of the Operation of a Persistent-Supercurrent Memory Cell," by R. L. Garwin from IBM Journal, October 1957, pages 304–308.